US011960850B2

(12) United States Patent
Anglin et al.

(10) Patent No.: US 11,960,850 B2
(45) Date of Patent: Apr. 16, 2024

(54) MULTILINGUAL SIMULTANEOUS INTERPRETATION USING A DISTRIBUTED LEDGER

(71) Applicant: INTERNATIONAL BUSINESS MACHINES CORPORATION, Armonk, NY (US)

(72) Inventors: Howard N. Anglin, Leander, TX (US); Su Liu, Austin, TX (US); Fehmina Merchant, Irvine, CA (US); Debbie Anglin, Leander, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 317 days.

(21) Appl. No.: 16/797,131

(22) Filed: Feb. 21, 2020

(65) Prior Publication Data

US 2021/0264117 A1 Aug. 26, 2021

(51) Int. Cl.
*G06F 40/58* (2020.01)
*G06F 16/27* (2019.01)
*G06F 40/242* (2020.01)

(52) U.S. Cl.
CPC .............. *G06F 40/58* (2020.01); *G06F 16/27* (2019.01); *G06F 40/242* (2020.01)

(58) Field of Classification Search
CPC ......... G06F 40/58; G06F 16/27; G06F 40/242
See application file for complete search history.

(56) References Cited

U.S. PATENT DOCUMENTS 5,535,120 A 7/1996 Chong et al.
6,370,498 B1 * 4/2002 Flores ..................... G06F 40/45
715/264

(Continued)

FOREIGN PATENT DOCUMENTS

CN 109697553 A 4/2019
KR 100539110 B1 12/2005
KR 20110088776 * 8/2011

OTHER PUBLICATIONS

Ma et al., "STACL: Simultaneous Translation with Implicit Anticipation and Controllable Latency using Prefix-to-Prefix Framework", URL: https://arxiv.org/pdf/1810.08398.pdf, Proceedings of the 57th Annual Meeting of the Association for Computational Linguistics, DOI: 10.18653/v1/P19-1289, dated Jul. 2019, retrieved Dec. 11, 2019, 12 pages.

(Continued)

*Primary Examiner* — Pierre Louis Desir
*Assistant Examiner* — Keisha Y. Castillo-Torres
(74) *Attorney, Agent, or Firm* — Teddi Maranzano

(57) ABSTRACT

Methods, apparatuses, and computer program products for multilingual simultaneous interpretation using a distributed ledger are disclosed. A multilingual interpretation server determines that a new word has been added to a first language node, the first language node corresponding to a first language, and broadcasts, to a plurality of other language nodes, a request to interpret the new word, wherein each of the plurality of other language nodes corresponds to a different language. Each of the plurality of language nodes interprets the new word into a particular language and adds the new word and one or more interpretations of the new word to an entry in a dictionary ledger. A multilingual interpretation service provides simultaneous multilingual translations of from a source language to a plurality of target languages using the shared distributed dictionary ledger. A (Continued)

multilingual interpretation client is provided for accessing services provided by the multilingual interpretation service.

20 Claims, 10 Drawing Sheets

(56) References Cited

U.S. PATENT DOCUMENTS

| | | | |
|---|---|---|---|
| 7,849,144 B2 | 12/2010 | Prajapat et al. | |
| 8,010,615 B2 | 8/2011 | Jimenez et al. | |
| 9,613,140 B2 | 4/2017 | Burgmeier et al. | |
| 9,619,466 B2* | 4/2017 | Davis | H04L 51/046 |
| 2003/0125927 A1 | 7/2003 | Seme | |
| 2006/0206304 A1* | 9/2006 | Liu | G06F 40/47 704/2 |
| 2009/0132233 A1* | 5/2009 | Etzioni | G06F 16/3332 707/E17.073 |
| 2009/0281789 A1* | 11/2009 | Waibel | G06F 40/40 704/260 |
| 2011/0179073 A1* | 7/2011 | Nilsson | G06F 9/454 707/769 |
| 2013/0114849 A1* | 5/2013 | Pengelly | G06F 40/58 382/103 |
| 2014/0297254 A1 | 10/2014 | Yeo et al. | |

OTHER PUBLICATIONS

Quach, "Linguists, update your resumes because Baidu thinks it has cracked fast AI translation", The Register, Emergent Tech, URL https://www.theregister.co.uk/2018/10/24/ai_translation_baidu/, dated Oct. 24, 2018, retrieved Dec. 11, 2019, 7 pages.

Rehm, "Artificial Intelligence and Conference Interpretation—From Smart Assistants fir the Human Interpreter to Automatic Solutions", DFKI GmbH, Language Technology Lab, Berlin, Germany, URL: https://www.slideshare.net/georgrehm/ai-and-conference-interpretation-from-smart-assistants-for-the-human-interpreter-to-automatic-solutions, clip slide, published Nov. 30, 2018, retrieved Dec. 12, 2019, 1 page (clip slide includes 35 slides).

Rosoka, "Multilingual NLP Solutions I Language Identification Software I Rosoka", Rosoka Series 7, URL: https://www.rosoka.com/capabilities, retrieved Dec. 11, 2019, 3 pages.

Wheatley, "Baidu creates the world's first simultaneous translation system", siliconANGLE, URL: https://siliconangle.com/2018/10/23/baidu-created-worlds-first-simultaneous-translation-system/, updated Oct. 23, 2018, retrieved Dec. 11, 2019, 7 pages.

Zeman, "NPFL120—Multilingual Natural Language Processing", Institute of Formal and Applied Linguistics, Langtech, UFAL, URL: https://ufal.mff.cuni.cz/courses/npfl120, retrieved Dec. 11, 2019, 3 pages.

* cited by examiner

```
┌─────────────────────────────────────────────────────────────────────────┐
│ determine, by a multilingual interpretation server, that a new word has │
│ been added to a first language node, the first language node            │
│ corresponding to a first language 610                                   │
└─────────────────────────────────────────────────────────────────────────┘
                                    │
                                    ▼
┌─────────────────────────────────────────────────────────────────────────┐
│ broadcast, to a plurality of other language nodes, a request to         │
│ interpret the new word, each of the plurality of other language nodes   │
│ corresponding to a different language 620                               │
└─────────────────────────────────────────────────────────────────────────┘
                                    │
                                    ▼
┌─────────────────────────────────────────────────────────────────────────┐
│ interpret, by each of the plurality of language nodes, the new word     │
│ into a particular language 630                                          │
└─────────────────────────────────────────────────────────────────────────┘
                                    │
                                    ▼
┌─────────────────────────────────────────────────────────────────────────┐
│ add the new word and one or more interpretations of the new word to an  │
│ entry in a dictionary ledger 640                                        │
└─────────────────────────────────────────────────────────────────────────┘
```

FIG. 6 determine, by a multilingual interpretation server, that a new word has been added to a first language node, the first language node corresponding to a first language 610 broadcast, to a plurality of other language nodes, a request to interpret the new word, each of the plurality of other language nodes corresponding to a different language 620 interpret, by each of the plurality of language nodes, the new word into a particular language 630 add the new word and one or more interpretations of the new word to an entry in a dictionary ledger 640 synchronize the first language node with the interpretations of the new word in the dictionary ledger 710

FIG. 7 determine, by a multilingual interpretation server, that a new word has been added to a first language node, the first language node corresponding to a first language 610 determine whether the new word in the first language exists in the dictionary ledger 810 create a new entry in the dictionary ledger for the new word in the first language 820 broadcast, to a plurality of other language nodes, a request to interpret the new word, each of the plurality of other language nodes corresponding to a different language 620 interpret, by each of the plurality of language nodes, the new word into a particular language 630 add the new word and one or more interpretations of the new word to an entry in a dictionary ledger 640

FIG. 8 determine, by a multilingual interpretation server, that a new word has been added to a first language node, the first language node corresponding to a first language 610 broadcast, to a plurality of other language nodes, a request to interpret the new word, each of the plurality of other language nodes corresponding to a different language 620 interpret, by each of the plurality of language nodes, the new word into a particular language 630 add the new word and one or more interpretations of the new word to an entry in a dictionary ledger 640 receive, from a client, a request to interpret a string in a source language to a plurality of target languages 910 generate a simultaneous multilingual interpretation of the string in the plurality of target languages 920 send, to the client, the multilingual interpretation of the string in the plurality of target languages 930

FIG. 9 determine, by a multilingual interpretation server, that a new word has been added to a first language node, the first language node corresponding to a first language 610 broadcast, to a plurality of other language nodes, a request to interpret the new word, each of the plurality of other language nodes corresponding to a different language 620 interpret, by each of the plurality of language nodes, the new word into a particular language 630 add the new word and one or more interpretations of the new word to an entry in a dictionary ledger 640 provide a multilingual interpretation client application 1010 provide a client application configured to request a simultaneous multilingual interpretation of a string 1020 provide a client application configured to receive the simultaneous multilingual interpretation 1030 provide a client application configured to deliver, to each audience member of a plurality of audience members, an interpretation from the multilingual interpretation that corresponds to a language of the audience member 1040

FIG. 10

MULTILINGUAL SIMULTANEOUS INTERPRETATION USING A DISTRIBUTED LEDGER

BACKGROUND

Field of the Invention

The field of the invention is data processing, or, more specifically, methods, apparatus, and products for multilingual simultaneous interpretation using a distributed ledger.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Multilingual simultaneous interpretation is a useful tool, for example, at events or conferences where the participants and audience members speak a wide variety of different languages. Increasingly, computer systems are used in machine interpretation and machine translation for multilingual simultaneous interpretation. However, there are an estimated 5,000 to 7,000 languages spoken today, and each year new words are added to those languages. For example, in January of 2018 the Oxford English Dictionary announced that it had added over 1,100 new words, senses, and subentries. By March of 2018, it had added more than 700 additional words, senses, and subentries.

It is difficult to manage large machine interpretation and machine translation dictionaries in different languages for handling newly added words to the vocabulary. Moreover, the qualities of machine interpretation and machine translation in different languages may be different due to, for example, the use of inconsistent dictionaries in different languages. Furthermore, it is difficult to synchronize machine interpretation and machine translation dictionaries with the original source language, and to know whether newly added words can be properly interpreted or translated.

SUMMARY

Embodiments in accordance with the present invention are directed to synchronizing and managing interpretation dictionaries in different languages for handling newly added words and making each newly added word available to all languages in an ecosystem of different languages. Embodiments in accordance with the present invention are also directed an interpretation service for providing intelligent simultaneous translations of a source language into multiple different target languages.

An embodiment in accordance with the present invention is directed to a method for multilingual simultaneous interpretation using a distributed ledger including determining, by a multilingual interpretation server, that a new word has been added to a first language node, the first language node corresponding to a first language, broadcasting, to a plurality of other language nodes, a request to interpret the new word, each of the plurality of other language nodes corresponding to a different language, interpreting, by each of the plurality of language nodes, the new word into a particular language, and adding the new word and one or more interpretations of the new word to an entry in a dictionary ledger.

Another embodiment in accordance with the present invention is directed to an apparatus for multilingual simultaneous interpretation using a distributed ledger the apparatus comprising a computer processor, a computer memory operatively coupled to the computer processor, the computer memory having disposed within it computer program instructions that, when executed by the computer processor, cause the apparatus to carry out the steps of determining, by a multilingual interpretation server, that a new word has been added to a first language node, the first language node corresponding to a first language, broadcasting, to a plurality of other language nodes, a request to interpret the new word, each of the plurality of other language nodes corresponding to a different language, interpreting, by each of the plurality of language nodes, the new word into a particular language, and adding the new word and one or more interpretations of the new word to an entry in a dictionary ledger.

Yet another embodiment in accordance with the present invention is directed to computer program product for multilingual simultaneous interpretation using a distributed ledger, the computer program product disposed upon a computer readable medium, the computer program product comprising computer program instructions that, when executed, cause a computer to carry out the steps of determining, by a multilingual interpretation server, that a new word has been added to a first language node, the first language node corresponding to a first language, broadcasting, to a plurality of other language nodes, a request to interpret the new word, each of the plurality of other language nodes corresponding to a different language, interpreting, by each of the plurality of language nodes, the new word into a particular language, and adding the new word and one or more interpretations of the new word to an entry in a dictionary ledger.

In various embodiments, the first language node and the plurality of other language nodes each include a plurality of words in a distinct language and interpretations of each of the plurality of words in a plurality of other languages. The dictionary ledger may be local instance of a distributed blockchain data structure shared by the first language node and the plurality of other language nodes. Various embodiments may also include synchronizing the first language node with the interpretations of the new word in the dictionary ledger. Determining, by the multilingual interpretation server, that the new word has been added to the first language node, the first language node corresponding to the first language may include determining whether the new word in the first language exists in the dictionary ledger and creating a new entry in the dictionary ledger for the new word in the first language.

Various embodiments may also include receiving, from a client, a request to interpret a string in a source language to a plurality of target languages, generating a simultaneous multilingual interpretation of the string in the plurality of target languages, and sending, to the client, the multilingual interpretation of the string in the plurality of target languages.

Various embodiments may also include providing a multilingual interpretation client application, wherein the multilingual interpretation client application is configured to request a simultaneous multilingual interpretation of a string, receive the simultaneous multilingual interpretation, and deliver, to each audience member of a plurality of audience members, an interpretation from the multilingual interpretation that corresponds to a language of the audience member.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 6 sets forth a flowchart illustrating an example method for multilingual simultaneous interpretation using a distributed ledger according to embodiments of the present invention;

FIG. 7 sets forth a flowchart illustrating another example method for multilingual simultaneous interpretation using a distributed ledger according to embodiments of the present invention;

FIG. 8 sets forth a flowchart illustrating another example method for multilingual simultaneous interpretation using a distributed ledger according to embodiments of the present invention;

FIG. 9 sets forth a flowchart illustrating another example method for multilingual simultaneous interpretation using a distributed ledger according to embodiments of the present invention; and FIG. 10 sets forth a flowchart illustrating another example method for multilingual simultaneous interpretation using a distributed ledger according to embodiments of the present invention.

DETAILED DESCRIPTION

Figure 1:
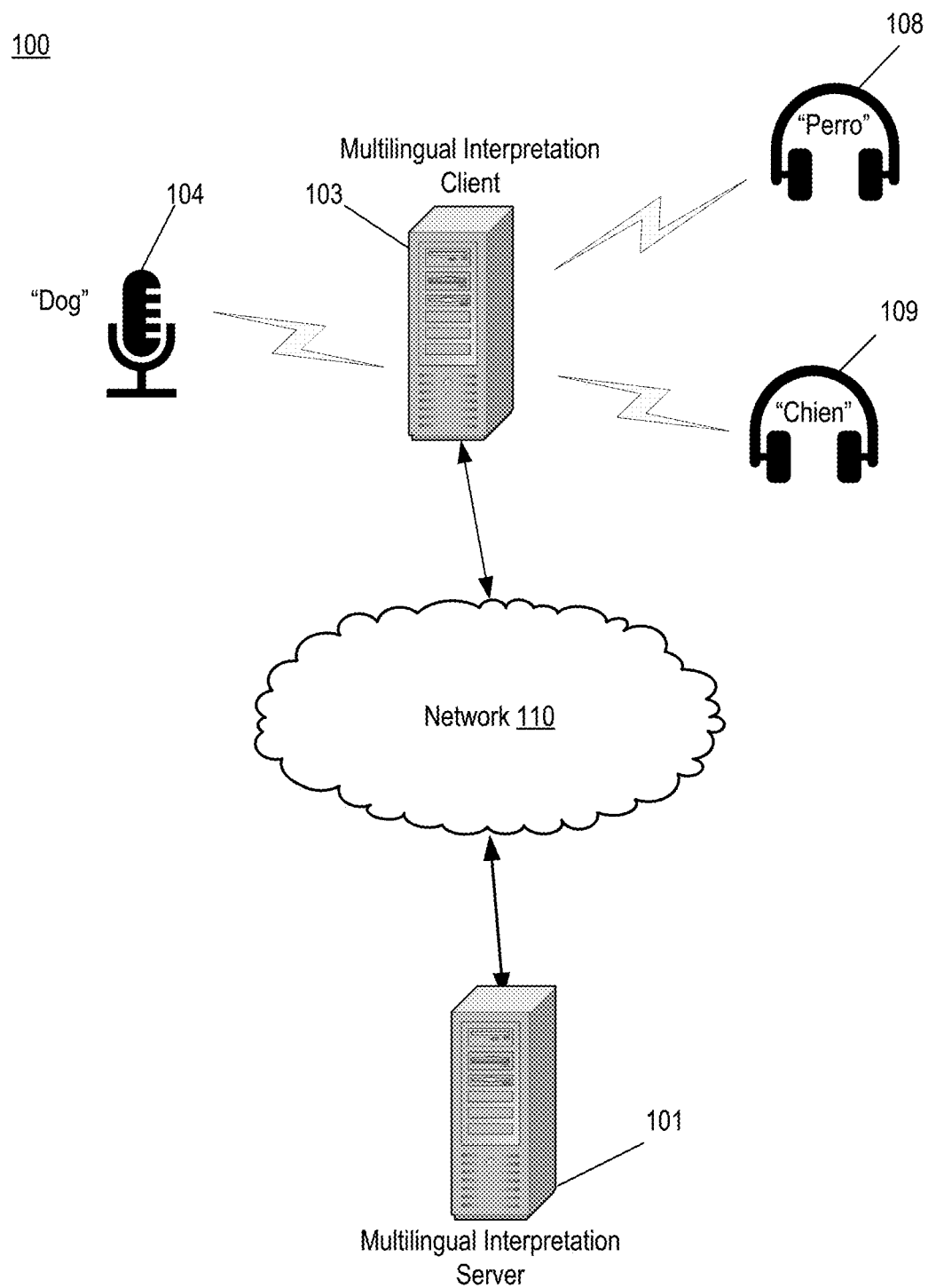
FIG. 1 sets forth a network diagram of a system configured for multilingual simultaneous interpretation using a distributed ledger according to embodiments of the present invention.

Exemplary methods, apparatus, and products for multilingual simultaneous interpretation using a distributed ledger in accordance with the present invention are described with reference to the accompanying drawings, beginning with FIG. 1. FIG. 1 sets forth a network diagram of a system configured for multilingual simultaneous interpretation using a distributed ledger according to embodiments of the present invention. The system (100) of FIG. 1 includes multilingual interpretation server (101) and the multilingual interpretation client (103). The multilingual interpretation server (101) provides a multilingual interpretation service to the multilingual interpretation client (103) through the network (110), for example, in a Software as a Service (SaaS) delivery model.

The multilingual interpretation server (101) receives a multilingual interpretation request that includes a one or more words (i.e., a string) in a source language and a plurality of different target languages. The multilingual interpretation server (101) may provide an application programming interface (API) for accepting multilingual interpretation requests from the multilingual interpretation client (103). For example, a header of a request may indicate source language and one or more target languages, and the payload of the request may include a string to be translated into the target languages from the source language. The multilingual interpretation server (101) simultaneously interprets the string into the target languages and provides a reply including the multilingual interpretation in a reply to the multilingual interpretation client (103).

The multilingual interpretation client (103) formats a multilingual interpretation request through the API provided by multilingual interpretation server (101) and receives the multilingual interpretation from the multilingual interpretation server (101) for distribution to an audience. In the particular example where a speaker addresses audience members of different native languages, the multilingual interpretation client (103) detects the language of the speaker (i.e., the source language) and a word or phrase spoken by the speaker via a microphone (104), converts the speaker's speech to text, identifies different target languages into which the word or phases is to be interpreted, and transmits the string in the source language and the identified target languages to the multilingual interpretation server (101) for interpretation. Continuing this example, the multilingual interpretation client (103) receives the multilingual interpretation reply from the multilingual interpretation server (101), determines the native language for each audience member, and delivers the interpretation in that native language to a headset (108, 109) of each audience member by converting the text of the interpretation into speech.

FIG. 1 illustrates, by way of example and not limitation, that a speaker says the word "dog" in English into the microphone (104), which is converted to text by a speech-to-text generator (not shown) of the multilingual interpretation client (103). The multilingual interpretation client (103) formats a multilingual interpretation request in which the source language is identified as English, a plurality of target languages (e.g., Spanish, French) are identified, and the word "dog" is included as a payload of the request. The multilingual interpretation request is transmitted to the multilingual interpretation server (101), which replies with the multilingual interpretation of "dog" into the target languages. The multilingual interpretation client (103) then identifies that an audience member speaks Spanish and another audience member speaks French, and respectively delivers to a headset (108, 109) each audience member the interpretation of "dog" in their respective native languages, for example, via a text-to-speech generator (not shown).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Multilingual simultaneous interpretation using a distributed ledger in accordance with the present invention is generally implemented with computers, that is, with automated computing machinery. In the system of FIG. 1, for example, all the multilingual interpretation server (101), and the multilingual interpretation client (103) are implemented to some extent at least as computers. For further explanation, therefore, FIG. 2 sets forth a block diagram of automated computing machinery comprising an exemplary computer (152) configured for multilingual simultaneous interpretation using a distributed ledger according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a multilingual interpretation manager (MIM) (310), a module of computer program instructions improved for multilingual simultaneous interpretation using a distributed ledger according to embodiments of the present invention, that includes a multilingual interpretation synchronization (MIS) service (330), a module of computer program instructions for synchronizing interpretations of words among multiple different languages, a multilingual simultaneous interpretation (MSI) service (350), a module of computer program instructions for simultaneously translating a word in source language into multiple different target languages, and an administration module (340), a module of computer program instructions for managing settings of the MIM (310). Also stored in RAM (168) is a local instance of a distributed dictionary ledger (307).

Also stored in RAM (168) is an operating system (154). Operating systems useful in computers configured for multilingual simultaneous interpretation using a distributed ledger according to embodiments of the present invention include UNIX™, Linux™, Microsoft XP™, AIX™, IBM's i5/OS™, and others as will occur to those of skill in the art. The operating system (154), the MIM (310), the MIS service (330), the MSI service (350), the administration module (340) and the distributed dictionary ledger (307) in the example of FIG. 2 are shown in RAM (168), but many components of such software typically are stored in non-volatile memory also, such as, for example, on a disk drive (170).

Figure 2:
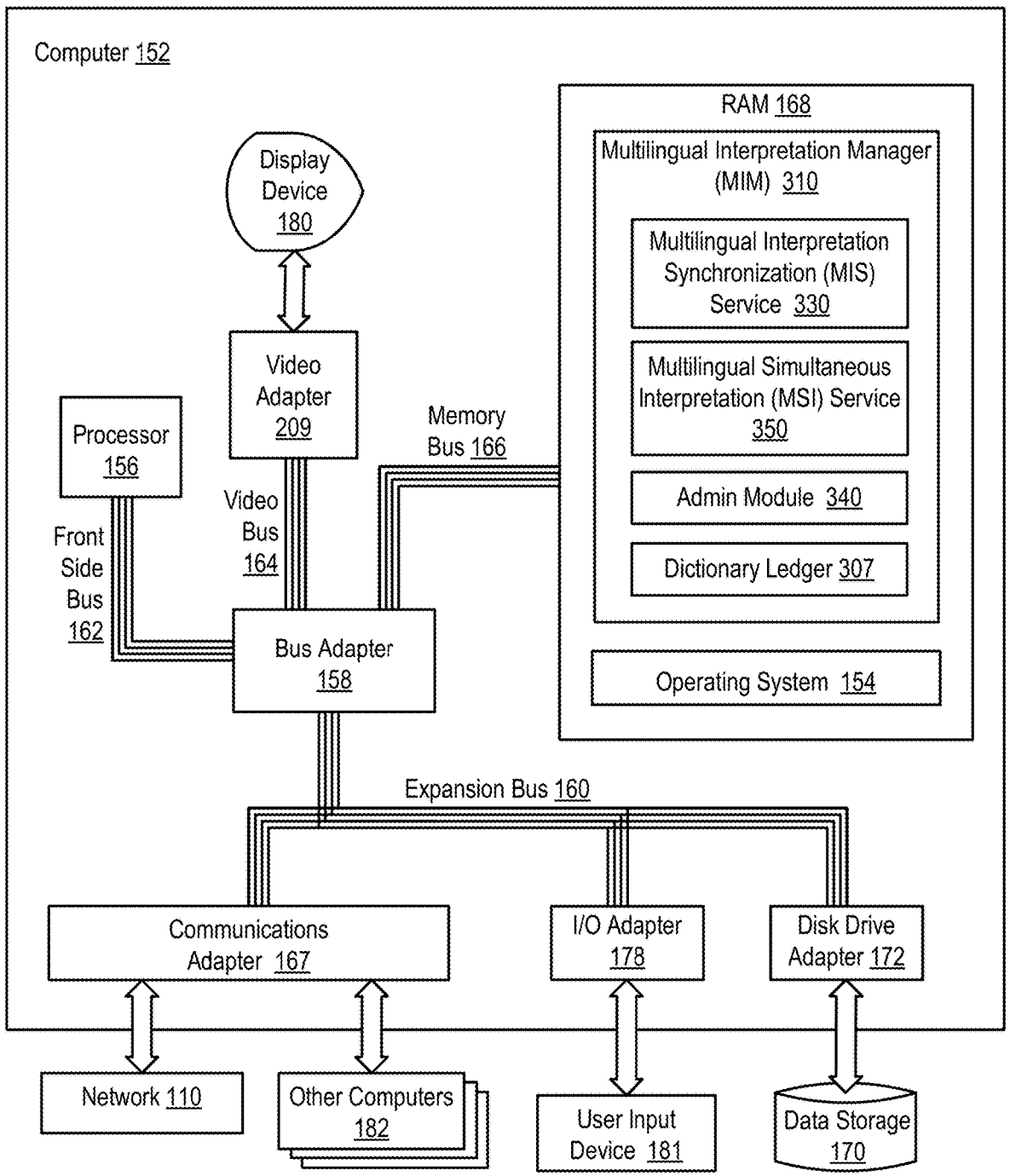
FIG. 2 sets forth a block diagram of an exemplary computer configured for multilingual simultaneous interpretation using a distributed ledger according to embodiments of the present invention.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for multilingual simultaneous interpretation using a distributed ledger according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (110). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for multilingual simultaneous interpretation using a distributed ledger according to embodiments of the present invention include modems for wired dial-up communications, Ethernet (IEEE 802.3) adapters for wired data communications, and 802.11 adapters for wireless data communications.

Figure 3:
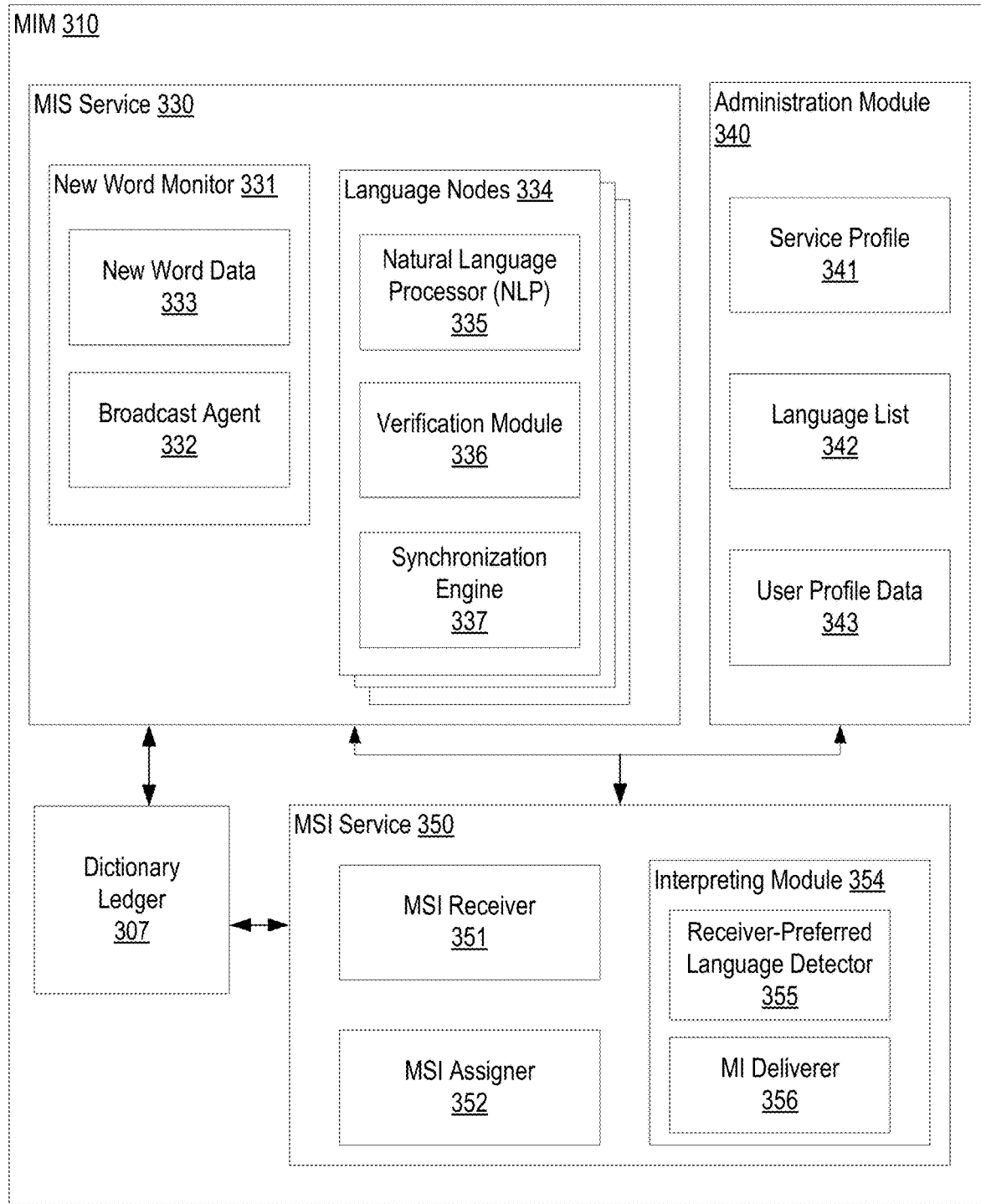
FIG. 3 sets forth a block diagram of a multilingual interpretation management system configured for multilingual simultaneous interpretation using a distributed ledger according to embodiments of the present invention.

For further explanation, FIG. 3 sets forth a block diagram of an exemplary multilingual interpretation management system configured for multilingual simultaneous interpretation using a distributed ledger according to embodiments of the present invention that includes a multilingual interpretation manager (MIM) (310).

In the example of FIG. 3, the MIM (310) includes a includes a multilingual interpretation synchronization (MIS) service (330) for synchronizing interpretations of words among multiple different languages and a multilingual simultaneous interpretation (MSI) service (350) for simultaneously translating a word in source language into multiple different target languages. The MIM (310) may be a centralized server, such as the exemplary computer of FIG. 2, or may be distributed among multiple servers. Accordingly, the MIS (330) and the MSI (350) may be provided in the same physical server or distributed among multiple servers.

In the example of FIG. 3, the MIS service (330) includes a new word monitor (331). The new word monitor (331) may automatically detect new words that are added to a language node (334), which may correspond to a conventional dictionary in a particular language. For example, the word "cat" may be detected as a new word added to the English language node. The word is stored as new word as new word data (333) by the new word monitor (331). For example, the new word data (331) may indicate that "cat" has been added to the English language node by the entry <en:"cat">. The new word monitor (331) may also receive new word data from the MSI (350) when the MSI (350) receives new a string input with a word that is not recognized and stores the new word data as new word data (333). The new word monitor (331) may also receive a direct input of new word data (333) from, for example, a user. Upon detection of a new word, the new word monitor (331) initiates a new transaction in the dictionary ledger (307) with the new word data (333). The new word monitor (331) further includes a broadcast agent (332) that, upon receiving or detecting the new word, transmits the new word data (333) to the language nodes of other languages for interpretation.

In the example of FIG. 3, the MIS service (330) includes one or more language nodes (334). Each language node (334) corresponds to a language (e.g., English, Spanish, French, etc.) and includes words and their translations into other languages. For example, the English language node may have an entry for the word "dog" and its translation into Spanish, French, etc. The Spanish language node may have the entry for "perro" and its translation into English, French, etc. The French language node may have the word "chien" and its translation into English, Spanish, etc. The different language nodes (334) each corresponding to a particular language may be comprised in the same instance of the MIM (310) or in different instances of the MIM (310). That is, an instance of the MIM (310) that includes the English language node (334) may reside on a server that is different from an instance of the MIM (310) that includes the Spanish language node (334). When new word data (333) is detected by the new word monitor (331), a natural language processor (NLP) (335) of the language node (334) may suggest an interpretation of the new word in one or more languages, which is added to the dictionary ledger (307). When new word data (333) is broadcast by the broadcast agent (332) to each language node (334) in a particular different language, each language node (334) adds its interpretation of the new word to the entry for the new word in the dictionary ledger (307). When a second language node (334) receives new word data (333) from the broadcast agent (332) of a first language node (334), the second language node (334) corresponding to a particular language adds the interpretation of the new word in the particular language to the dictionary ledger (307). If an interpretation of the new word in the particular language has already been added, an interpreted word verification module (336) of the second language node (334) verifies the interpretation of the new word and/or corrects the interpretation of the new word in that particular language. Once interpretations of the new word have been added to the entry in the dictionary ledger (307), a synchronization engine (337) of the language node (334) synchronizes the interpretations in the dictionary ledger (307) with those maintained by the language node (334).

Figure 4:
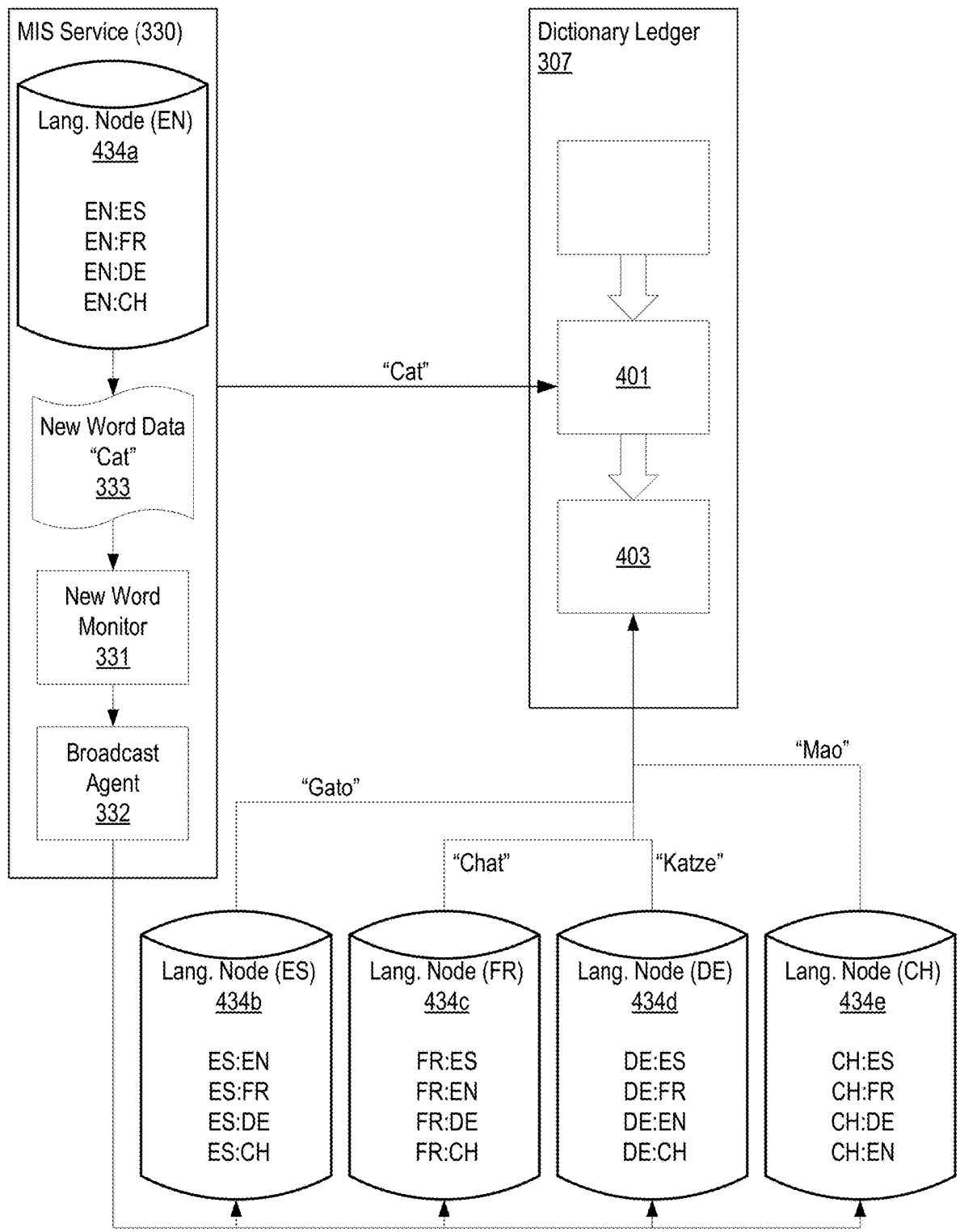
FIG. 4 sets forth an example of a new word addition according to embodiments of the present invention.

For further explanation, FIG. 4 illustrates a non-limiting example of the introduction of a new word. FIG. 4 depicts an English language node (434a), a Spanish language node (434b), a German language node (434d), a French language node (434c), and a Chinese language node (434e), all of which are similarly configured as the language node (334) of FIG. 3. In FIG. 4, consider that new word data (333) for a new word "cat" has been added to the English language node (434a) and/or received from the MSI service (350). The new word monitor (331) detects the new word and the broadcast agent (332) transmits the new word data (333) to the Spanish language node (434b), the German language node (434c), the French language node (434e), and the Chinese language node (434e) for interpretation into those particular languages. Further, the English language node (434a) creates a block (401) in the distributed dictionary ledger (307) corresponding to the English word "cat." Each language node (434b-e) then adds the corresponding interpretation in that language to the block (401) or a subsequent block (403) in the dictionary ledger (307) indicating the English word "cat" and its interpreted pairs. For example, the Spanish language node (434b) adds "gato," the German language node (434c) adds "katze," the French language node (434e) adds "chat," and the Chinese language node (434e) adds "mao" to the block (403) as interpretations of the new word "cat" in the block (401). The new word "cat" and its interpretations may then be synchronized among the language nodes (434a-e) by propagating the entries in dictionary ledger (307) to each language node (434a-e).

Returning to the example of FIG. 3, the MIM (310) may also include an administration module (340) for managing settings of the MIM (310). The administration module (340) may include a service profile (341) defining the SaaS parameters for services provided by the MIM (310), a language list (342) corresponding to languages for which the MIM (310) may provide interpretation service, and one or more user profiles (343) of users of the MIM (310) and their corresponding primary language.

In the example of FIG. 3, the MSI service (350) includes an MSI receiver (351) for receiving interpretation requests from a multilingual interpretation client (MIC) (510) (see FIG. 5), the interpretation request including a source language, a target language of the receiving client (510), and a string to be interpreted into the target language. The MSI service (350) also includes an MSI assigner (352) that assigns the request to an interpreting module (354) of the MSI service (350) based on the source language indicated in the request. For example, if the source language is English, the MSI assigner (352) assigns the request to an interpreting module that interprets English source words into other languages. The interpreting module (354) further includes a receiver-preferred language detector (355) that identifies a target language from the request and/or identifies a target language from the language list (342) corresponding to a primary language of a user defined in the user profile data (343). The interpreting module (354) then accesses the dictionary ledger (307) based on the identified source language and the identified receiver-preferred language, and a multilingual interpretation deliverer (356) provides the requested interpretation to the MIC (510). If a translation of the word is not recognized by the interpreting module (354), the MSI service (350) provides the word to the MIS service (330) for interpretation.

Figure 5:
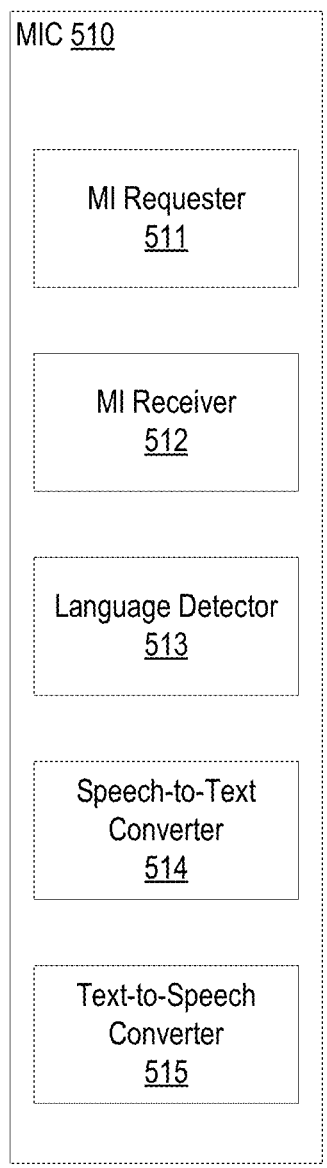
FIG. 5 sets forth a block diagram of a multilingual simultaneous interpretation client configured for multilingual simultaneous interpretation using a distributed ledger according to embodiments of the present invention.

For further explanation, FIG. 5 sets forth a block diagram of an exemplary multilingual simultaneous interpretation client configured for multilingual simultaneous interpretation using a distributed ledger according to embodiments of the present invention that includes the multilingual interpretation client (MIC) (510), a module of computer program instructions for requesting multilingual interpretations from the multilingual simultaneous interpretation (MSI) service (350). The MIC (510) includes a language detector (513) that detects the language of an input word or phrase (i.e., a source language). The input word or phrase may be a text input or may be speech that is converted to text by a speech-to-text converter (514). The MIC (510) further includes a multilingual interpretation requestor (511) that formats the input word or phrase and source language into a request and sends the request for interpretation into one or more target languages to the MSI (350). For example, the request may be sent using an API provided by the MSI (350). The MIC (510) further includes a multilingual interpretation receiver (512) that receives the multilingual interpretation into one or more target languages from the MSI (350) and delivers the interpreted word or phrase to one or more recipients in their native language, for example, as a text output or as a speech output generated by a text-to-speech converter (515). For example, when word "dog" is spoken by a speaker, the speech-to-text generator (514) converts the spoken word "dog" to a text input, and the language detector (513) determines the source language to be English. The multilingual interpretation requestor (511) generates a request with the source language, target language(s), and input string and transmits the request to the MSI (350). The multilingual interpretation receiver (512) receives a reply from the MSI (350) that includes the Spanish interpretation "perro" and the French interpretation "chien" and delivers the interpretations, respectively, to a Spanish speaking audience member and a French speaking audience member.

For further explanation, FIG. 6 sets forth a flow chart illustrating an exemplary method for multilingual simultaneous interpretation using a distributed ledger according to embodiments of the present invention that includes determining (610), by a multilingual interpretation server, that a new word has been added to a first language node, the first language node corresponding to a first language. Determining (610), by a multilingual interpretation server, that a new word has been added to a first language node, the first language node corresponding to a first language may be carried out by the new word monitor (331) in the MIS (330) of the MIM (310) determining that a new word has been added to a first language node (334). For example, the new word monitor (331) may detect that a new word has been added to an English language node (334) by determining that a new word has been added to a dictionary of a particular language published by a dictionary publisher, by detecting a word received by the MSI (330) in a source language is not recognized in a shared dictionary ledger (307), or through direct input of a new word into the language node (334). Continuing a previous example, if the new word "cat" is added to an English language dictionary published by an dictionary publisher, or that a request for interpretation of the word "cat" from English to another language is received by the MSI (350) and the word "cat" is not present in the dictionary ledger (307), the new word monitor (331) determines that a new word has been added to the English language node (334).

The method of FIG. 6 also includes broadcasting (620), to a plurality of other language nodes, a request to translate the new word, each of the plurality of other language nodes corresponding to a different language. Broadcasting (620), to a plurality of other language nodes, a request to translate the new word, each of the plurality of other language nodes corresponding to a different language may be carried out by the broadcast agent (332) transmitting new word data (333) to a plurality of language nodes (334) corresponding to a plurality of different languages with a request that each language node (334) corresponding to a particular language interpret the new word data (333) into an equivalent in the particular language. Continuing a previous example, the broadcast agent (332), upon the new word monitor (331) detecting that the new word "cat" has been added to the English language node (434*a*), transmits a request for interpretation of the word cat to the Spanish language node (434*b*), the German language node (434*c*), the French language node (434*e*), and the Chinese language node (434*e*).

The method of FIG. 6 also includes interpreting (630), by each of the plurality of language nodes, the new word into a particular language. Interpreting (630), by each of the plurality of language nodes, the new word into a particular language may be carried out by each language node (334) in a particular language interpreting the new word data (333) in the source language into an equivalent word in the particular language. For example, each language node (334) may use natural language processing (NLP) native to the particular language for determining an interpretation of the new word data (333) (e.g., by cross-referencing or correlating definitions in different languages), may determine that an equivalent word for the new word data (333) already exists in the language node (334) for the particular language, or may obtain an interpretation of the new word data (333) from an external source (e.g., from a user, an administrator, or through crowd-sourcing). Continuing the previous example, the Spanish language node (434*b*) may receive the new word data (333) containing the English word "cat" and interpret the new word to be "gato" in Spanish.

The method of FIG. 6 also includes adding (640) the new word and one or more interpretations of the new word to an entry in a dictionary ledger. Adding (640) the new word and one or more interpretations of the new word to an entry in a dictionary ledger may be carried out by each language node (334) adding the interpreted word to a block in the dictionary ledger (307) that corresponds to the new word. The dictionary ledger (307) is local instance of a distributed blockchain data structure shared by the first language node and the plurality of other language nodes. For example, each language node (334) in particular language may add a corresponding interpretation of the new word to a block corresponding to the new word or each language node (334) may add a corresponding source:target language pair to a block corresponding to the new word or a subsequent block. Continuing the previous example, a new block (401) may be created in the dictionary ledger (307) for the new English word "cat" from the English language node (434*a*). To the block (401), the Spanish language node (434*b*) adds "gato," the German language node (434*c*) adds "katze," the French language node (434*e*) adds "chat," and the Chinese language node (434*e*) adds "mao." Alternatively and additionally, the Spanish language node (434*b*) may add the English: Spanish pair "cat":"gato" to a subsequent block (403), and so on for other language nodes. The dictionary ledger (307) may then be used to provide consistent interpretations of the new word, and the various language nodes (334) in each language may synchronize interpretations of the new word with the dictionary ledger (307) to quickly propagate the addition of the new word. Each language node (334) corresponding to a particular language may add its interpretation to a local instance of a shared blockchain dictionary ledger (307), which is then synchronized with the instance of the shared blockchain dictionary ledger (307) that is local to the first language node (334). Thus, the MIM (310) may receive the interpretations added by other language nodes (334) via the shared dictionary ledger (307).

For further explanation, FIG. 7 sets forth a flow chart illustrating a further exemplary method for multilingual simultaneous interpretation using a distributed ledger according to embodiments of the present invention. The method of FIG. 7 is like the method of FIG. 6 in that the method of FIG. 7 also includes determining (610), by a multilingual interpretation server, that a new word has been added to a first language node, the first language node corresponding to a first language, broadcasting (620), to a plurality of other language nodes, a request to translate the new word, each of the plurality of other language nodes corresponding to a different language, interpreting (630), by each of the plurality of language nodes, the new word into a particular language, and adding (640) the new word and one or more interpretations of the new word to an entry in a dictionary ledger.

The method of FIG. 7 differs from the method of FIG. 6 in that the method of FIG. 7 further includes synchronizing (710) the first language node with the interpretations of the new word in the dictionary ledger. Synchronizing (710) the first language node with the interpretations of the new word in the dictionary ledger may be carried out by the synchronization engine (337) of the language node (334) synchronizing the interpretations of the new word in the dictionary ledger (307) with interpretations that are maintained in the language node (334). For example, after each language node corresponding to a particular language adds an interpretation of the new word to the dictionary ledger (307), those interpretations in the various different languages are propagated to the language node (334) corresponding to the first language. Continuing a previous example, the first language node (334) may be the English language node (434a) that maintains interpretations of words in the English language in a plurality of different languages. When a new word "cat" is added to the English language node (434a), other language nodes (434b-e) add corresponding interpretations of "cat" to the dictionary ledger (307) as previously described. The interpretations added to the dictionary ledger may then be propagated to the English language node (434a) to synchronize the English language node (434a) with the dictionary ledger (307).

For further explanation, FIG. 8 sets forth a flow chart illustrating a further exemplary method for multilingual simultaneous interpretation using a distributed ledger according to embodiments of the present invention. The method of FIG. 8 is like the method of FIG. 6 in that the method of FIG. 8 also includes determining (610), by a multilingual interpretation server, that a new word has been added to a first language node, the first language node corresponding to a first language, broadcasting (620), to a plurality of other language nodes, a request to translate the new word, each of the plurality of other language nodes corresponding to a different language, interpreting (630), by each of the plurality of language nodes, the new word into a particular language, and adding (640) the new word and one or more interpretations of the new word to an entry in a dictionary ledger.

The method of FIG. 8 differs from the method of FIG. 6 in that determining (610), by the multilingual interpretation server, that the new word has been added to the first language node, the first language node corresponding to the first language includes determining (810) whether the new word in the first language exists in the dictionary ledger. Determining (810) whether the new word in the first language exists in the dictionary ledger may be carried out by the MSI service (350) receiving a request to interpret a source word in a source language and determining that the source word in the source language does not exist in the dictionary ledger (307). Continuing the example of FIG. 4, the MSI service (350) may receive a request to interpret the word "cat" from English to a target language. The MSI service (350) may attempt to find the source word "cat" in the dictionary ledger (307) but does not find it. The MSI service (350) may then notify the MIS service (330) that a new word "cat" has been added to the English language node (434a) and interpretation into target languages is requested.

The method of FIG. 8 also differs from the method of FIG. 6 in that determining (610), by the multilingual interpretation server, that the new word has been added to the first language node, the first language node corresponding to the first language further includes creating (820) a new entry in the dictionary ledger for the new word in the first language. Creating (820) the new entry in the dictionary ledger for the new word in the first language may be carried out by the MIS service (330) creating a new block in the dictionary ledger (307) for the new word. Continuing the example of FIG. 4, the MIS service (330) creates block (401) in the dictionary ledger (307) for the new word "cat."

For further explanation, FIG. 9 sets forth a flow chart illustrating a further exemplary method for multilingual simultaneous interpretation using a distributed ledger according to embodiments of the present invention. The method of FIG. 9 is like the method of FIG. 6 in that the method of FIG. 9 also includes determining (610), by a multilingual interpretation server, that a new word has been added to a first language node, the first language node corresponding to a first language, broadcasting (620), to a plurality of other language nodes, a request to translate the new word, each of the plurality of other language nodes corresponding to a different language, interpreting (630), by each of the plurality of language nodes, the new word into a particular language, and adding (640) the new word and one or more interpretations of the new word to an entry in a dictionary ledger.

The method of FIG. 9 differs from the method of FIG. 6 in that the method of FIG. 9 also includes receiving (910), from a client, a request to interpret a string in a source language to a plurality of target languages. Receiving (910), from the client, the request to interpret the string in the source language to a plurality of target languages may be carried out by the MSI receiver (351) of the MSI service (350) receiving a request for a multilingual interpretation of a source word in a source language from the MIC (510). In an embodiment, the request identifies the plurality of target languages. In another embodiment, the plurality of languages are identified from the receiver-preferred language detector (355), the user profile data (343) and/or the language list (342). For example, the MSI receiver (351) may receive a request with a header indicating the source language and a payload indicating the source word, and may also include in the header the plurality of target languages.

The method of FIG. 9 also includes generating (920) a simultaneous multilingual interpretation of the string in the plurality of target languages. Generating (920) a simultaneous multilingual interpretation of the string in the plurality of target languages may be carried out by the MSI service (350) interpreting the source word into each of the plurality of target languages using the dictionary ledger (307). For example, a source word in English is interpreted into Spanish, French, etc. by the MSI (350) identifying the source word and the corresponding interpretations in the target languages from in the dictionary ledger (307). The MSI assigner (352) may assign the request to a plurality of interpreting modules (354) corresponding to the plurality of target languages or all languages identified in the language list (342). Each interpreting module (354) generates an interpretation of the string into its corresponding language from the dictionary ledger (307).

The method of FIG. 9 also includes sending (930), to the client, the multilingual interpretation of the string in the plurality of target languages. Sending (930), to the client, the multilingual interpretation of the string in the plurality of target languages may be carried out by the multilingual interpretations deliverer (356) compiling the interpretations generated by each interpreting module (354) into a multilingual interpretation and delivering, collectively, each interpretation of the source word into the plurality of target languages to the MIC (510). For example, an interpretation of the source word into Spanish, French, etc. is collectively delivered to the MIC (510).

For further explanation, FIG. 10 sets forth a flow chart illustrating a further exemplary method for multilingual simultaneous interpretation using a distributed ledger according to embodiments of the present invention. The method of FIG. 10 is like the method of FIG. 6 in that the method of FIG. 10 also includes determining (610), by a multilingual interpretation server, that a new word has been added to a first language node, the first language node corresponding to a first language, broadcasting (620), to a plurality of other language nodes, a request to translate the new word, each of the plurality of other language nodes corresponding to a different language, interpreting (630), by each of the plurality of language nodes, the new word into a particular language, and adding (640) the new word and one or more interpretations of the new word to an entry in a dictionary ledger.

The method of FIG. 10 differs from the method of FIG. 6 in that the method of FIG. 10 also includes providing (1010) a multilingual interpretation client application, wherein the multilingual interpretation client application is configured to request (1020) a simultaneous multilingual interpretation of a string, receive (1030) the simultaneous multilingual interpretation, and deliver (1040), to each audience member of a plurality of audience members, an interpretation from the multilingual interpretation that corresponds to a language of the audience member. Providing (1010) a multilingual interpretation client application may be carried out by the MIM (310) providing the MIC (510) as a downloadable application to a client device. Requesting (1020) a simultaneous multilingual interpretation of a string may be carried out by the MIC (510), using an API of the MIM (310) defined in the MIC (350), providing a source language and a source word for interpretation into a plurality of target languages in a request to the MSI (350). Receiving (1030) the simultaneous multilingual interpretation may be carried out by the MIC (510) receiving simultaneously receiving the interpretations of the source word in the target languages from the MSI (350). Delivering (1040), to each audience member of a plurality of audience members, an interpretation from the multilingual interpretation that corresponds to a language of the audience member may be carried out by the MIC (350) identifying an audience member user and the primary language of the audience member user from the user profile data (343) and sending each audience member user an interpretation of the source word corresponding to their primary language.

In view of the explanations set forth above, readers will recognize that the benefits of multilingual simultaneous interpretation using a distributed ledger according to embodiments of the present invention include improvements to machine interpretation of a source language to a several different target languages, increased capability in propagating a new word in a source language to other languages, enhanced consistency among dictionary interpretations in different languages using a shared distributed dictionary leger, and increased speed in simultaneous machine interpretations of a source language to several different target languages using a using a shared distributed dictionary ledger.

Exemplary embodiments of the present invention are described largely in the context of a fully functional computer system for multilingual simultaneous interpretation using a distributed ledger. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of multilingual simultaneous interpretation using a distributed ledger, the method comprising:
determining, by a multilingual interpretation server, that a new word has been added to a first language node, the first language node corresponding to a first language;
broadcasting, to a plurality of other language nodes, a request to interpret the new word, each of the plurality of other language nodes corresponding to a different language;
interpreting, by each of the plurality of language nodes, the new word into a particular language;
adding the new word and one or more interpretations of the new word to an entry in a dictionary ledger, wherein the dictionary ledger is a distributed ledger; and
providing a multilingual interpretation client application configured to:
request, from the multilingual interpretation server, a multilingual interpretation of a string; and
deliver, to a user and based on the request, the multilingual interpretation of the string, wherein the multilingual interpretation includes at least one of the one or more interpretations of the new word.

2. The method of claim 1, wherein the first language node and the plurality of other language nodes each include a plurality of words in a distinct language and interpretations of each of the plurality of words in a plurality of other languages, and wherein the first node and each of the plurality of language nodes have a local instance of the distributed ledger.

3. The method of claim 2, further comprising synchronizing the first language node with the interpretations of the new word in the dictionary ledger, wherein adding the new word to the entry in the dictionary ledger is performed by the first language node, and wherein adding the one or more interpretations of the new word to the entry in the dictionary ledger is performed by one or more of the plurality of other nodes corresponding to the one or more interpretations of the new word, and wherein synchronizing the first language node with the interpretations of the new word in the dictionary ledger includes synchronizing the local instance of the distributed ledger in the first node with the local instances of the distributed ledger of the plurality of other language nodes.

4. The method of claim 1, wherein determining, by the multilingual interpretation server, that the new word has been added to the first language node, the first language node corresponding to the first language includes:
determining whether the new word in the first language exists in the dictionary ledger; and creating a new entry in the dictionary ledger for the new word in the first language.

5. The method of claim 1, further comprising:
receiving, from a client, a request to interpret a string in a source language to a plurality of target languages;
generating a simultaneous multilingual interpretation of the string in the plurality of target languages; and
sending, to the client, the multilingual interpretation of the string in the plurality of target languages.

6. The method of claim 1, wherein the multilingual interpretation client application is configured to:
request a simultaneous multilingual interpretation of a string;
receive the simultaneous multilingual interpretation; and
deliver, to each audience member of a plurality of audience members, an interpretation from the multilingual interpretation that corresponds to a language of the audience member.

7. The method of claim 1, wherein the dictionary ledger is a local instance of a distributed blockchain data structure shared by the first language node and the plurality of other language nodes, and wherein adding the new word and the one or more interpretations of the new word to the entry in the dictionary ledger includes adding a block to the distributed blockchain data structure that includes the new word and the one or more interpretations of the new word.

8. An apparatus for multilingual simultaneous interpretation using a distributed ledger, the apparatus comprising a computer processor, a computer memory operatively coupled to the computer processor, the computer memory having disposed within it computer program instructions that, when executed by the computer processor, cause the apparatus to carry out the steps of:
determining, by a multilingual interpretation server, that a new word has been added to a first language node, the first language node corresponding to a first language;
broadcasting, to a plurality of other language nodes, a request to interpret the new word, each of the plurality of other language nodes corresponding to a different language;
interpreting, by each of the plurality of language nodes, the new word into a particular language;
adding the new word and one or more interpretations of the new word to an entry in a dictionary ledger, wherein the dictionary ledger is a distributed ledger; and
providing a multilingual interpretation client application configured to:
request, from the multilingual interpretation server, a multilingual interpretation of a string; and
deliver, to a user and based on the request, the multilingual interpretation of the string, wherein the multilingual interpretation includes at least one of the one or more interpretations of the new word.

9. The apparatus of claim 8, wherein the first language node and the plurality of other language nodes each include a plurality of words in a distinct language and interpretations of each of the plurality of words in a plurality of other languages.

10. The apparatus of claim 8, further comprising synchronizing the first language node with the interpretations of the new word in the dictionary ledger.

11. The apparatus of claim 8, wherein determining, by the multilingual interpretation server, that the new word has been added to the first language node, the first language node corresponding to the first language includes:
determining whether the new word in the first language exists in the dictionary ledger; and
creating a new entry in the dictionary ledger for the new word in the first language.

12. The apparatus of claim 8, further comprising:
receiving, from a client, a request to interpret a string in a source language to a plurality of target languages;
generating a simultaneous multilingual interpretation of the string in the plurality of target languages; and
sending, to the client, the multilingual interpretation of the string in the plurality of target languages.

13. The apparatus of claim 8, wherein the multilingual interpretation client application is configured to:
request a simultaneous multilingual interpretation of a string;
receive the simultaneous multilingual interpretation; and
deliver, to each audience member of a plurality of audience members, an interpretation from the multilingual interpretation that corresponds to a language of the audience member.

14. The apparatus of claim 8, wherein the dictionary ledger is a local instance of a distributed blockchain data structure shared by the first language node and the plurality of other language nodes.

15. A computer program product for multilingual simultaneous interpretation using a distributed ledger, the computer program product disposed upon a non-transitory computer readable storage medium, the computer program product comprising computer program instructions that, when executed, cause a computer to carry out the steps of:
determining, by a multilingual interpretation server, that a new word has been added to a first language node, the first language node corresponding to a first language;
broadcasting, to a plurality of other language nodes, a request to interpret the new word, each of the plurality of other language nodes corresponding to a different language;
interpreting, by each of the plurality of language nodes, the new word into a particular language;
adding the new word and one or more interpretations of the new word to an entry in a dictionary ledger, wherein the dictionary ledger is a distributed ledger; and
providing a multilingual interpretation client application configured to:
request, from the multilingual interpretation server, a multilingual interpretation of a string; and
deliver, to a user and based on the request, the multilingual interpretation of the string, wherein the multilingual interpretation includes at least one of the one or more interpretations of the new word.

16. The computer program product of claim 15, wherein the first language node and the plurality of other language nodes each include a plurality of words in a distinct language and interpretations of each of the plurality of words in a plurality of other languages.

17. The computer program product of claim 15, further comprising synchronizing the first language node with the interpretations of the new word in the dictionary ledger.

18. The computer program product of claim 15, wherein determining, by the multilingual interpretation server, that the new word has been added to the first language node, the first language node corresponding to the first language includes:
determining whether the new word in the first language exists in the dictionary ledger; and
creating a new entry in the dictionary ledger for the new word in the first language.

19. The computer program product of claim 15, further comprising:

receiving, from a client, a request to interpret a string in a source language to a plurality of target languages;

generating a simultaneous multilingual interpretation of the string in the plurality of target languages; and sending, to the client, the multilingual interpretation of the string in the plurality of target languages.

20. The computer program product of claim 15, wherein the multilingual interpretation client application is configured to:

request a simultaneous multilingual interpretation of a string;

receive the simultaneous multilingual interpretation; and deliver, to each audience member of a plurality of audience members, an interpretation from the multilingual interpretation that corresponds to a language of the audience member.

* * * * *